INVENTOR.
William H. Morris, Jr.
BY Ralph R. Pittman
Agent

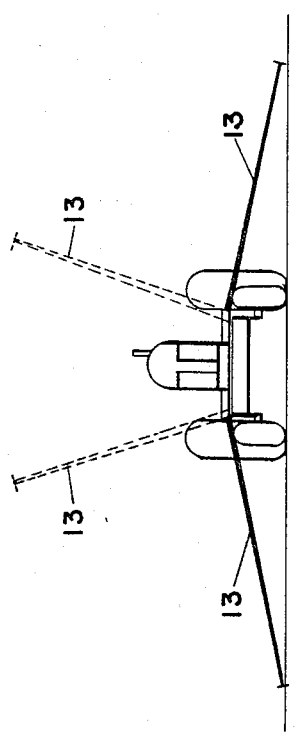
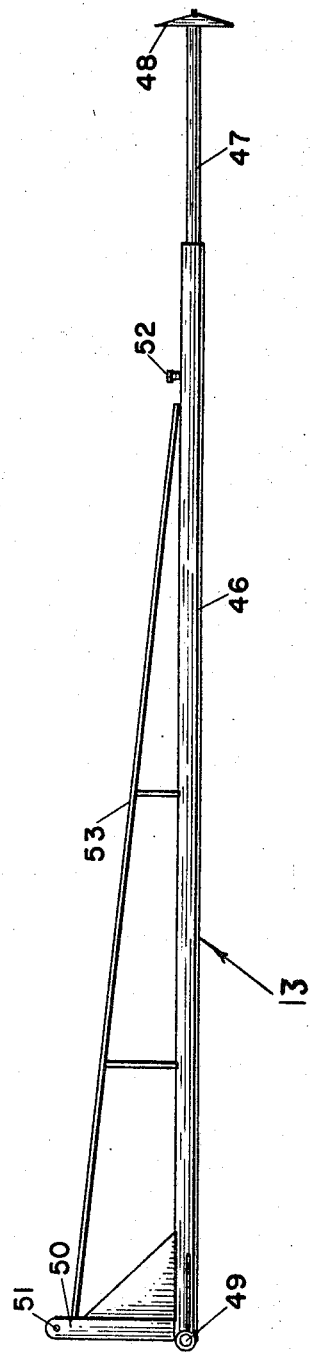

July 1, 1969
W. H. MORRIS, JR
3,452,825
SIDE BOOM ATTACHMENT FOR TRACTOR HAVING
REAR-DIRECTED LIFTING HOOKS
Filed Sept. 26, 1966
Sheet 3 of 3
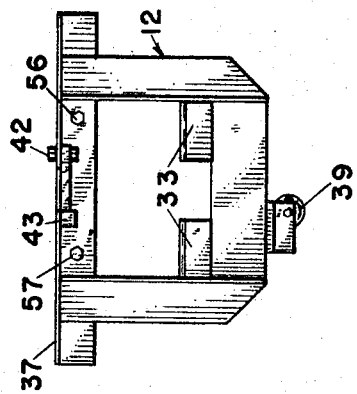
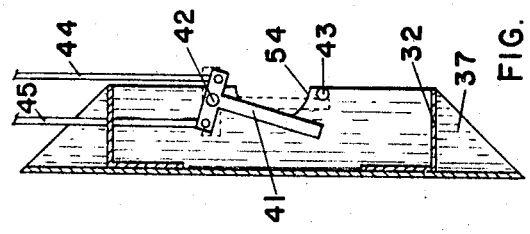
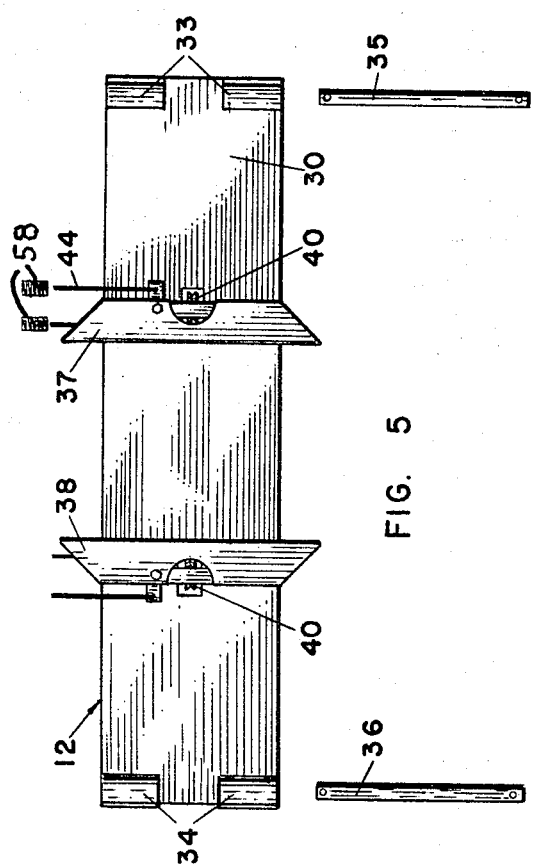
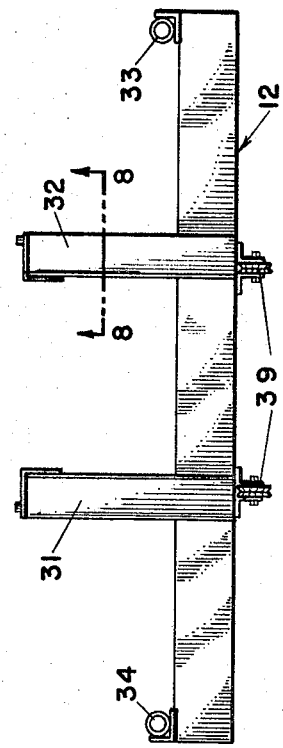
INVENTOR.
William H. Morris, Jr.
BY Ralph R. Pittman
Agent 3,452,825
**SIDE BOOM ATTACHMENT FOR TRACTOR HAV-
ING REAR-DIRECTED LIFTING HOOKS**
William H. Morris, Jr., P.O. Box 208,
Lonoke, Ark. 72806
Filed Sept. 26, 1966, Ser. No. 581,971
Int. Cl. A01b 59/00, 35/32
U.S. Cl. 172—127                                                10 Claims

ABSTRACT OF THE DISCLOSURE

A side boom attachment for a farm tractor having a soil marking disk at the outer end includes mechanisms removably attached to and combined with moving members of the tractor so that the boom is lowered from a latched nonoperative position to an unlatched operative position in response to predetermined change in the direction of movement of the tractor, and so that the boom may be raised through its connection to rear-directed lifting hooks of the tractor.

---

This invention relates generally to a side boom attachment for use with a farm tractor having rear-directed lifting hooks, and more specifically to an improved boom attachment having a soil marking element at its outer end.

Soil marking devices, either as attachments or as integral parts of farm planters, have been known in the art, and are of course limited to the function of the machine in which they are embodied.

The principal object of the present invention is the provision of a removable boom attachment for a tractor such that the tractor may be used either with or without the attachment, and such that the tractor with the attachment is capable of performing a plurality of duties; as for example, use with a seeder or planter to designate the planted area or, alternately, use with a fertilizer scatterer for marking the area fertilized.

Prior art markers, as a part of the farm equipment pulled by a tractor, are disposed to the rear of the operator of the tractor and thus incorrectly located from the standpoint of visibility to the operator. It is therefore an object of the present invention to provide a marker structure in which the marking element is disposed in front of the tractor driver, thus enabling the driver to continuously view the marker from a normal forward-facing position.

Since the usual type of farm tractor is adapted for use with many attachments, such as cultivators, drills, disk harrows and broadcasting machines, the tractor frame is provided with a plurality of spaced holes for use in bolting attachments to the tractor in such a way that they may be readily removed when desired. It is therefore an object of the present invention to provide a side boom attachment including only two brackets which may be readily bolted to and removed from the tractor.

Another object is to provide a side boom having an adjustable reach much greater than that of presently available devices, this objective being attained by a telescopic construction of the boom member, this construction at the same time enabling the tractor to be moved along highways without contacting overhead electric conductors when the boom is fully telescoped and latched in a raised position.

A yet further object is the provision of a boom latching mechanism, particularly adapted for use with planters and drills, for selectively lowering one or the other side boom members in response to a change in direction of the tractor; that is, in response to a right turn, the left boom member drops, and in response to a left turn, the right boom member drops.

A further important object is to provide an improved side boom attachment for farm tractors having the foregoing capabilities and at the same time having a simple and rugged construction for long life in use, and susceptible of economic manufacture.

Other objects and advantages will appear from the description and the accompanying drawings illustrating one embodiment of the invention, of which:

FIG. 2 is a front view illustrating some of the alternate positions of the boom member with respect to the tractor;

FIG. 3 is a plan view of the boom member;

FIG. 4 is an elevational view of the boom member;

FIG. 5 is a plan view of the forward bracket;

FIG. 6 is a front elevational view of the forward bracket;

FIG. 7 is an end view of the forward bracket; and

FIG. 8 is a fragmentary sectional view of a portion of the forward bracket, taken along the line 8—8 in FIG. 7.

Figure 1:
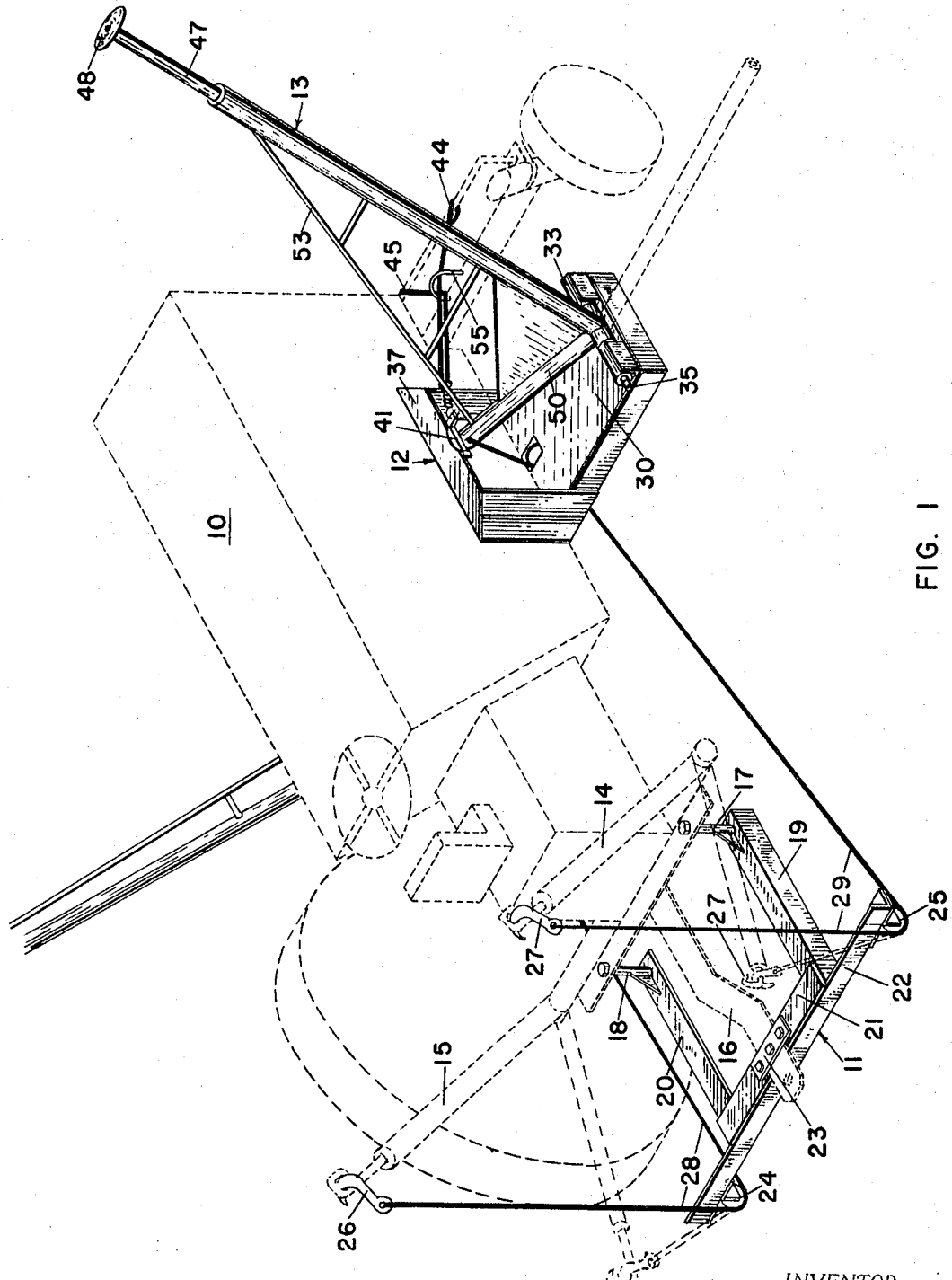
FIG. 1 is a perspective view of the side boom attachment applied to the tractor outlined.

Referring more specifically to FIG. 1, it may be noted that the generally U-shaped rear bracket 11 is removably bolted to the rear of the tractor 10 by the bolts 17 and 18, and the arms 19 and 20 of the bracket extend respectively rearward therefrom in spaced relationship and longitudinally with respect to the tractor. The outer ends of the arms 19 and 20 are joined by the transversely extending plate member 21 and the angle 22, the latter extending outward beyond the respective ends of the arms. The tractor draw bar 16 rests upon and extends rearwardly beyond the outer end of the U-shaped bracket, and is attached thereto by the bolted clip 23. All of the elements of the rear bracket 11 are cut from ordinary steel shapes.

In accordance with the usual construction, the tractor 10 is equipped with a pair of rigidly joined, hydraulically driven rear-directed steel lifting hooks 14 and 15, for convenience in handling bulky articles. These hooks swing together through vertical planes parallel to the principal axis of the tractor, and their operation is controlled by the operator of the tractor from the tractor seat.

Located forward of the tractor steering wheel, a forward steel bracket 12 extends transversely across the tractor and along the underside thereof, projecting outwardly from each side of the tractor. Each projection, as shown in detail in FIGS. 5, 6, 7 and 8, includes the floor portion 30 extended outwardly beyond the latch housing formed by the upstanding wall members 31 and 32, and the roof portions 37 and 38. The openings 56 and 57 indicated in FIG. 7 provide for passage of fastening bolts therethrough, and in this particular embodiment register with the tractor frame holes also used for attaching a cultivator to the tractor.

The side boom members 13 are pivotally mounted for outward swingable movement at the respective outer end portions of the floor portions 30 by means of pivot pins 35 and 36, which extend through the floor bearings 33 and 34 and the boom bearing 49. Each boom member includes at least two steel pipe elements; the main tubular boom element 46, into which is endwise slip-fitted the telescoping jib boom element 47, and at the outer end of the latter is rotatably mounted the soil marking disk 48. The set screw 52 is provided for fixing the jib boom member in place after it has been adjusted to provide the desired boom length. An integral actuating arm 50 extends laterally from the pivoted end of each boom member, and the brace 53 extends from near the outer end of the arm 50 to a point near the outer end of the main boom element 46.

At the respective outer ends of the rear bracket transverse angle 22, and coplanar with the swingably directed path of movement of the lifting hooks 14 and 15 between their upper and lower positions are rotatably mounted the metal pulleys 24 and 25, the latter being aligned (FIGS. 5 and 6) with the longitudinally directed forward bracket pulleys 39 for cooperation with the transversely directed forward bracket pulleys 40.

The wire-rope boom operating cables 28 and 29 are reeved through the pulleys, hooked to the lifting hooks 14 and 15 by means of the rear cable terminal hooks 26 and 27, and fastened to the actuating arm (FIG. 4) 50 at the cable terminal 51, the arrangement being such that each boom member is raised and lowered between its up and down position in response to a corresponding joint movement of the hooks 14 and 15.

As shown in FIGS. 1 and 8, the roof portions 37 and 38 are centrally notched as indicated by the numeral 54, the notch being located in the path of movement of the outer end of the boom actuating arm 50. A T-shaped steel latch member 41 is pivotally mounted along the underside of each roof by the pivot 42, the latch member being disposed for the transverse swingable movement of the stem of the T to a position across the notch 54 to the stop 43, or away from the notch 54 to engagement with the inside of the roof portion.

A pair of wire-rope latch cables 44 and 45, each having one end thereof fastened to the respective outer ends of the crossbar of the T-shaped latch member, extend forward through the guide 55, diverging from the guide forwardly with each of the other ends joined at spaced points to the tie rod of the steering mechanism of the tractor. The tension springs 58 are serially inserted in each cable to take up slack, since the T-shaped latch member is unbiased in any direction and moves only in response to a difference in tension between the cables, as when this difference is established by a movement of the tie rod for turning the tractor.

From the above description, it will be apparent that the side boom members will move up and down in response to corresponding movements of the pair of lifting hooks unless the path of an actuating arm of one or of each of the boom members is obstructed by a latch member. It will also be apparent that the latch members, being unbiased, may assume either a latched or an unlatched position in response to a manual pull upon the appropriate latch control cable, as well as by movement of the tie rod of the tractor.

For marking areas in connection with large broadcasting machines, such as fertilizer scatterers, the latching arrangement may not be used, since selective boom operation is not required. For this duty, it is desired to have the widest practical spacing between the marking disks; the side booms in one practical construction of the invention could be extended to 16 feet on each side of the tractor center line, providing a broadcast strip marking 32 feet wide.

The latching arrangement is most advantageously employed when the tractor is used with planters or drills to provide a mark on only one or the other side of the tractor, depending upon its direction. If, for example, the left hand side boom is in the up position and the right hand side boom is in the down or marking position as the machines move across a field, it is necessary, upon reaching the end of the field, to turn the tractor through 180 degrees, this reversal in direction requiring the left hand boom to be in the down position and the right hand boom to be in the up position.

These changes in boom positions are controlled by the movement of the latch members in response to the turning of the tractor. The tension of each latch control cable, being fastened at a different point on the tie rod from any other cable, varys in response to the movement of the tie rod so that the left boom member is unlatched and released to drop in response to a right turn, and similarly, the right boom member is arranged to drop in response to a left turn. This arrangement greatly speeds up planting operations, because of the speed with which the switching of the boom is effected. In actual operation, one man has planted rice at the rate of 53 acres per hour using this invention, this rate of planting being attainable not only by rapid boom switching, but also further facilitated by the clear field of view of the markers from the seat of the tractor.

I claim as my invention:

1. A side boom attachment for a tractor having driving means for swingably actuating a pair of transversely spaced, rigidly joined and rear-directed lifting hooks between an up position and a down position and a steering mechanism which includes a transversely extending and swingably movable tie rod disposed at the forward end of the tractor, said attachment comprising rear and forward brackets removably secured to said tractor, the rear bracket extending longitudinally from the rear of said tractor and the forward bracket extending transversely from a forward portion of said tractor, said forward bracket projecting from each side of the tractor, a boom member pivotally mounted at the outer end of each projection for outward swingable movement between an upper and a lower position, each boom member having an integral actuating arm extending laterally from its pivoted end, a boom-operating cable fastened at one end to one of said lifting hooks and at the other end to the outer end of one of said boom-actuating arms for raising and lowering said boom member in response to a corresponding movement of said hooks, a plurality of spaced pulleys mounted on said brackets through which said cable is reeved for establishing its path of movement, latch means having a latch member movable between a latching and an unlatching position, said latching member engaging the outer end of one of said boom-actuating arms to thereby latch said boom in the upper position, and latch control means including a pair of latch-operating cables joining said latch member to said tie rod at transversely spaced junctures for unlatching said boom member in response to a predetermined swingable movement of said tie rod.

2. The structure defined in claim 1, wherein the fastening of the boom-operating cable to the lifting hook is effected by engagement with a coopearting hook attached to said one end of said cable.

3. A side boom attachment for a tractor having driving means for swingably actuating a pair of transversely spaced, rigidly joined and rear-directed lifting hooks between an upper and a lower position, said attachment including rear and forward brackets removably secured to said tractor, the rear bracket extending longitudinally from the rear of said tractor and the forward bracket extending transversely across a forward portion of said tractor, said forward bracket projecting from each side of the tractor, each projection including a floor portion and a roof portion, a boom member pivtally mounted at the outer end of each floor portion for outward swingable movement between an upper and lower postion, each boom member having an integral actuating arm extending laterally from its pivoted end, a central roof notch disposed in the patch of movement of said arm and a pivotally mounted latch member carried by said roof portion, said latch member being movable across and away from said notch, and a pair of latch cables connecting said latch member to the steering mechanism of the tractor for moving said latch member in response to a predetermined turning movement of said tractor, a boom-operating cable fastened at one end to one of said lifting hooks and at the other end to the outer end of one of said boom-actuating arms for raising and lowering said boom in response to a corresponding movement of said hooks, and a plurality of spaced pulleys carried by said brackets through which said boom-operating cable is reeved for establishing its path of movement.

4. The structure defined in claim 3, wherein the forward bracket is located forward of the tractor steering wheel.

5. The construction according to claim 3, wherein said latch member is T-shaped in form and disposed for movement of the stem portion of the T-shaped member across and away from said notch, and the latch cables are fastened at the respective outer ends of the crossbar of the T-shaped member.

6. The construction according to claim 3, wherein said boom member includes at least two coaxially extending telescopic elements.

7. The construction according to claim 3, wherein a soil-marking disk is rotatably mounted at the outer end of said boom member for contacting the ground when said boom member is in its lower position.

8. The construction in accordance with claim 3, wherein said spaced pulleys include a first pair of transversely spaced pulleys one of which is co-planar with the swingable path of one of said lifting hooks, and a second pair of transversely spaced pulleys one of which is co-planar with the swingable path of one of said boom members.

9. The construction in accordance with claim 5, wherein said latch member is unbiased both in its position across said notch and away from said notch, and each of said latch cables includes a serial tension spring.

10. The combination with a tractor having driving means for swingably actuating a pair of transversely spaced, rigidly joined and rear-directed lifting hooks between an up position and a down position and a steering mechanism including a transversely extending and swingably movable tie rod disposed at the forward end of the tractor, of a side boom attachment comprising pivotal mounting means for an outwardly swingable boom member, cable means connecting said boom member to said lifting hooks for swinging said boom member between an up and a down position in response to a corresponding movement of said lifting hooks, latch means having at latch member movable between a latching and an unlatching position, said latching member holding said boom member in the up position when in the latching position, latch control means including a pair of cables joining said latch member to said tie rod at transversely spaced junctures for unlatching said boom member for movement to the down position upon the occurrence of a predetermined swingable movement of said tie rod, and a coextensive helical spring interposed in each of said cables between said tie rod and said latch member.

References Cited

UNITED STATES PATENTS

| 2,586,356 | 2/1952 | Lewis | 172—128 |
| 2,975,840 | 3/1961 | Sorensen et al. | 172—128 |

ABRAHAM G. STONE, *Primary Examiner.*

RONALD C. HARRINGTON, *Assistant Examiner.*